United States Patent [19]

Chow et al.

[11] 4,366,518

[45] Dec. 28, 1982

[54] MULTI-TRACK HEAD ASSEMBLY

[75] Inventors: William W. Chow; Davis S. Fields, Jr., both of Tucson, Ariz.

[73] Assignee: International Business Machines Corporation, Armonk, N.Y.

[21] Appl. No.: 183,559

[22] Filed: Sep. 2, 1980

[51] Int. Cl.³ .............................................. G11B 5/27
[52] U.S. Cl. .................................. 360/121; 360/125; 29/603
[58] Field of Search .............................. 360/119–122, 360/127, 125; 29/603

[56] References Cited

U.S. PATENT DOCUMENTS 3,613,228 10/1971 Cook et al. .......................... 29/603
3,655,923 4/1972 Lang, Jr. ............................ 360/125

FOREIGN PATENT DOCUMENTS 1529967 10/1978 United Kingdom ................. 29/603

OTHER PUBLICATIONS

IBM/TDB "Fabrication of Narrow Track***", by Frost et al., vol. 7, No. 11, Apr. 1965.

Primary Examiner—John H. Wolff
Attorney, Agent, or Firm—Nathan N. Kallman; Henry E. Otto, Jr.

[57] ABSTRACT

A method of manufacturing a novel ferrite magnetic head assembly utilizes two ferrite pieces having extending fingers of closely similar dimensions that are joined in interleaving fashion and bonded to a ceramic substrate. The resultant assembly is sliced to provide closure sections for multi-track magnetic heads. Each closure section is joined to a ferrite wafer such that the wafer and closure section define a transducing gap therebetween.

4 Claims, 5 Drawing Figures

MULTI-TRACK HEAD ASSEMBLY

DESCRIPTION

1. Technical Field

This invention relates to a novel multitrack magnetic head assembly.

An object of this invention is to provide a multitrack magnetic head assembly that affords high data track density.

Another object of this invention is to provide a multitrack magnetic head assembly that minimizes the separation between data tracks recorded on a magnetic medium.

Another object is to provide a multitrack magnetic head assembly that allows improved track definition.

A further object is to provide a multitrack magnetic head assembly that affords a reduction in manufacturing steps and savings in cost are realized.

2. Background Art

Generally, multitrack magnetic heads are formed by bonding single track modules, such as described in U.S. Pat. No. 3,613,228, by way of example. It is apparent that a multiplicity of modules must be properly aligned and have similar dimensions to result in precisely positioned tracks and accurately define track widths, among other things. The steps of alignment, joinder and machining the several elements to precise predetermined dimensions are costly and time consuming.

BRIEF DESCRIPTION OF THE DRAWINGS

The invention will be described in detail with reference to the drawings in which.

Similar numerals refer to similar elements throughout the drawings.

DISCLOSURE OF THE INVENTION

Figure 1:
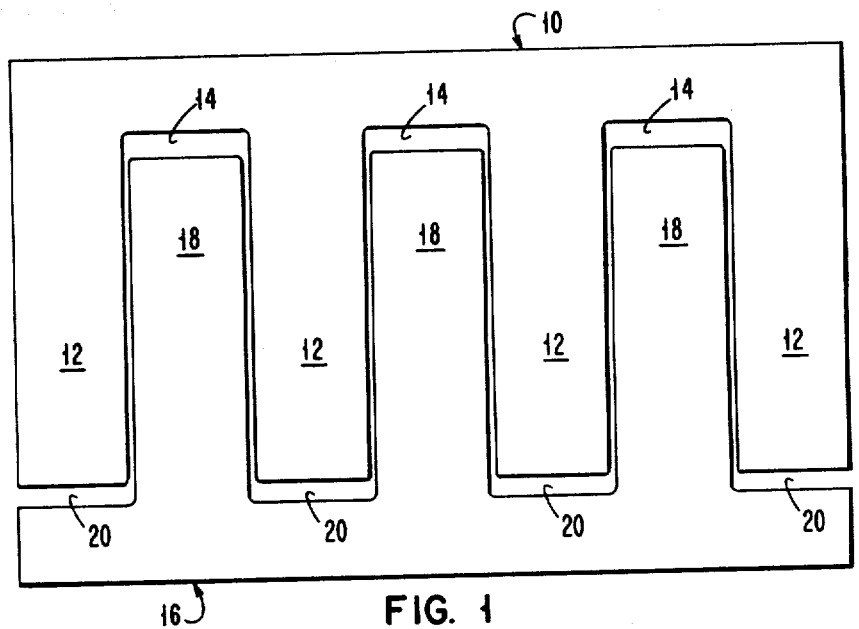
FIG. 1 is a plan view of two ferrite pieces disposed in an interleaved configuration, in accordance with this invention.

With reference to FIG. 1, a first ferrite piece 10 is formed with alternating fingers 12 and slots 14, and a second ferrite piece 16 is formed with similar alternating fingers 18 and slots 20. The number of slots 14 corresponds to the number of fingers 18, and the number of slots 20 corresponds to the number of fingers 12. The slots 14 and 20 are of the same dimensions, and are slightly larger in length and width than the fingers 12 and 18. For example, the width of each slot is approximately 700 microns, and the width of each finger is about 500 microns. The depth or the height of the slots and fingers is about 1 mm, by way of example. The slots may be gang sawed or wire sawed individually, by well known techniques, so that the slots and fingers have substantially parallel sides, and the fingers closely fit with the slots.

Figure 2:
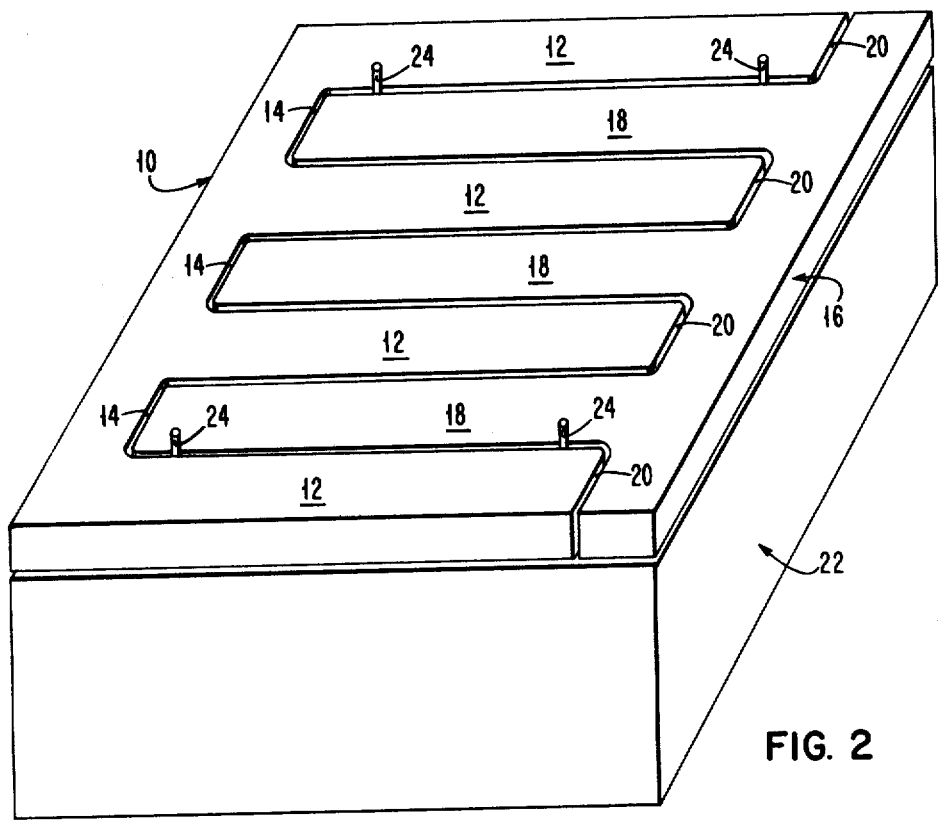
FIG. 2 is an isometric view of the two interleaved ferrite pieces and a substrate block preparatory to joining.

The ferrite pieces 10 and 16 are bonded together, preferably by glass, and to a nonmagnetic ceramic substrate 22, as illustrated in FIG. 2. To ensure accurate alignment, metal wires or shims 24 are fixed securely between the ferrite pieces to act as spacers. The ferrite pieces 10 and 16 are positioned and aligned on the substrate prior to glass bonding. The alignment between the ferrite pieces is critical, whereas the alignment to the substrate is less significant.

Figure 3:
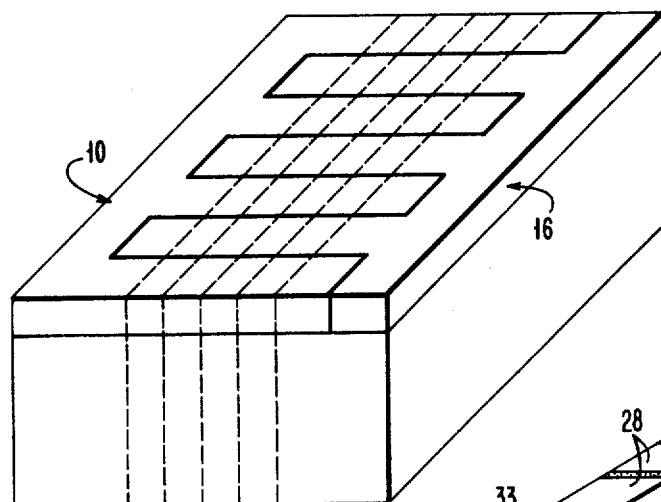
FIG. 3 is an isometric view illustrating the joined assembly of the ferrite pieces and the substrate block prior to slicing.
Figure 4:
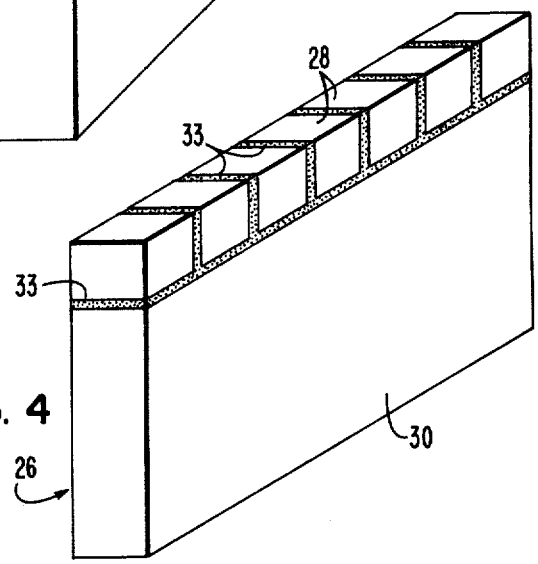
FIG. 4 is an enlarged isometric view of a sliced section, which will serve as a multitrack write head closure, in accordance with this invention.

The bonded assembly is sliced into closure sections, as shown by the dash lines in FIG. 3. As depicted in FIG. 4, each closure section 26 consists of a row of magnetic ferrite blocks 28 supported by a nonmagnetic substrate 30. The ferrite blocks are joined together and to the nonmagnetic substrate 30 by glass bonding 33. The width of the ferrite blocks 28 determines the width of the data tracks, and the width of the glass bond 33 between the ferrite blocks 28 establishes the separation distance between the data tracks.

Figure 5:
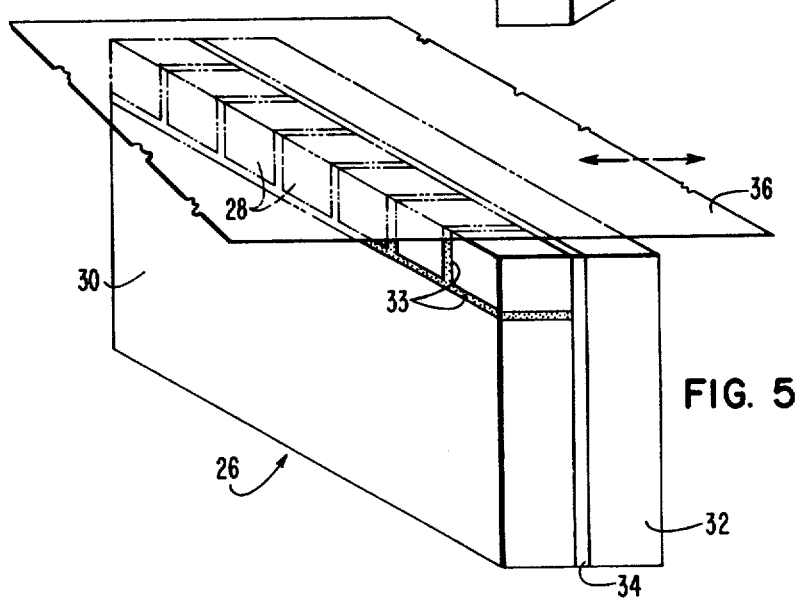
FIG. 5 is an isometric view of a write head module having a ferrite wafer joined to the write head closure, as utilized with this invention.

Finally, a ferrite wafer 32 having the same length and width as the closure section 26 is cemented to the section 26 to form a write head, as depicted in FIG. 5. A cement layer 34 between the wafer 32 and section 26 delineates the transducing gap that co-acts with a magnetic medium, such as a magnetic tape 36, shown in part in FIG. 5. Multiple tracks are recorded along the moving tape 36 that correspond in width to the width of each ferrite block 28 disposed on the substrate 30.

By virtue of this invention, a thicker cutting wheel that affords greater rigidity and less wobble may be used for cutting slots in ferrite, with the realization of accurate alignment and spacing of the multiple tracks. The use of a thicker cutting wheel can greatly improve tool life. The novel configuration and method allows a simplified, inexpensive approach to be employed for making multitrack magnetic heads.

What is claimed is:

1. A multitrack magnetic head assembly comprising:
   a nonmagnetic substrate;
   at least three equal width, uniformly spaced magnetic blocks arranged in a row and joined at their respective first faces to one surface of said substrate for forming a closure section;
   a magnetic wafer disposed a preselected distance from, and joined to, another surface of said substrate substantially perpendicular to said one surface and to respective second faces of said magnetic blocks that are substantially perpendicular to said first faces, said preselected distance defining a common transducing gap for respective magnetic head elements defined between each magnetic block and the common magnetic wafer, thereby to provide a composite head assembly capable of concurrently processing data from multiple tracks of a multiple track magnetic recording medium.

2. A multitrack magnetic head assembly as in claim 1 wherein said magnetic blocks are formed from two different magnetic members, each having a series of slots and projecting fingers, said members being displaced laterally such that their fingers are interleaved prior to being joined and sliced to create individual magnetic blocks that are alternately derived from one and then the other of said different members.

3. A multitrack magnetic head assembly as in claim 1, wherein said substrate is made of a ceramic material.

4. A multitrack magnetic head assembly as in claim 1, wherein said magnetic blocks are made of ferrite.

* * * * *